March 27, 1934.  J. A. SPENCER  1,952,897
TEMPERATURE CONTROL APPARATUS
Filed June 5, 1931
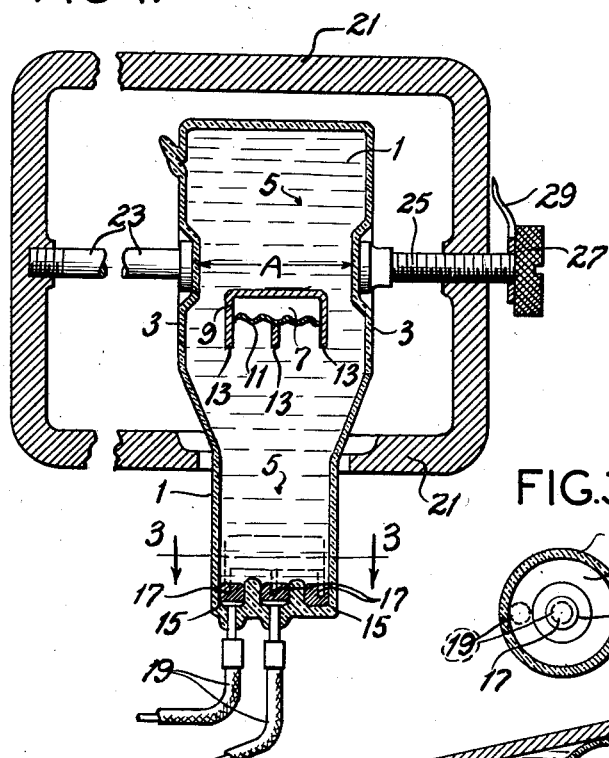
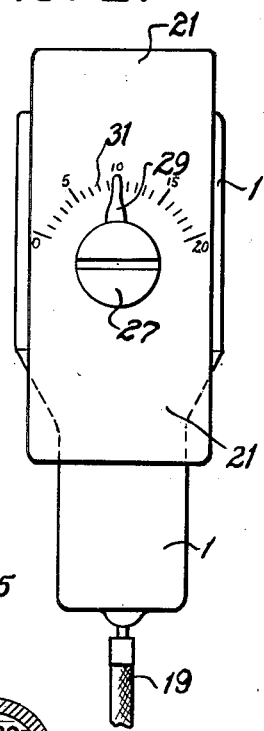
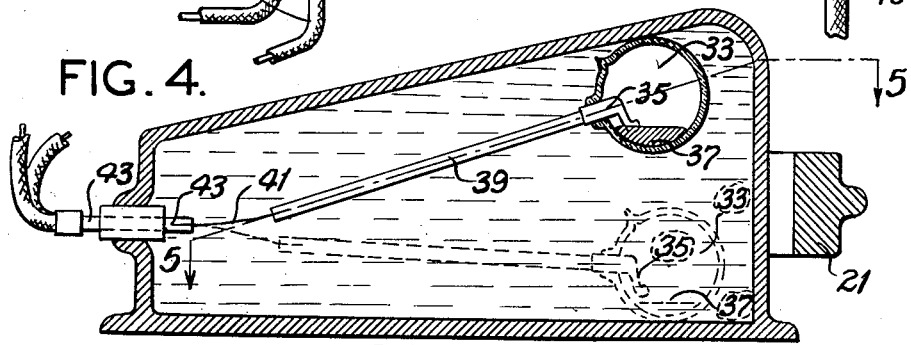
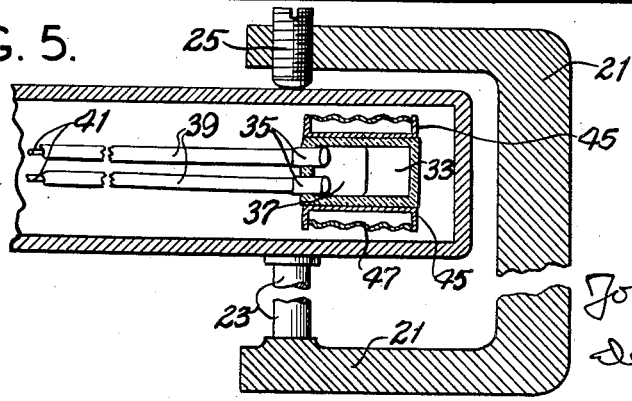
John A. Spencer,
Inventor
Deloz F. Haynes
Attorney Patented Mar. 27, 1934

1,952,897

UNITED STATES PATENT OFFICE 1,952,897

TEMPERATURE CONTROL APPARATUS

John A. Spencer, Newtonville, Mass., assignor to General Plate Company, Newton, Mass., a corporation of Massachusetts Application June 5, 1931, Serial No. 542,284

15 Claims. (Cl. 200—136)

This invention relates to temperature control apparatus, and, with regard to certain more specific features, to thermostats.

Among the several objects of the invention may be noted the provision of a thermostat adapted for the control of electrical circuits and for the control of other apparatus which is sensitive to relatively small temperature variations, which makes positive electrical contacts capable of carrying currents of sufficient magnitude for the use to which it is put, which is reliable and rugged in operation and involves a minimum number of parts likely to be worn, and which is manually adjustable over a relatively large range of temperature. Other objects will be in part obvious and in part pointed out hereinafter.

The invention accordingly comprises the elements and combinations of elements, features of construction, and arrangements of parts, which will be exemplified in the structure hereinafter described, and the scope of the application of which will be indicated in the following claims.

In the accompanying drawing in which are illustrated several of various possible embodiments of the invention, Fig. 1 is a diagram showing a vertical section of a thermostat embodying the invention;

Fig. 2 is a right-side elevation of the thermostat of Fig. 1;

Fig. 3 is a horizontal section taken substantially on line 3—3 of Fig. 1;

Fig. 4 is a diagram showing a vertical section similar to Fig. 1 but illustrating an alternative embodiment of the invention; and, Fig. 5 is a horizontal section taken substantially along line 5—5 of Fig. 4.

Similar reference characters indicate corresponding parts throughout the several views of the drawing.

Referring now more particularly to Fig. 1, there is illustrated at numeral 1 a sealed container, formed entirely of glass or partly of glass and partly of metal. Other suitable materials may likewise be used. The container 1 is provided with at least one flexible face 3 (the present embodiment having two such flexible faces 3) which is sufficiently flexible to permit of changes of interior volume of the container 1 as will be described hereinafter.

The container 1 is completely filled, prior to sealing, with a liquid 5. The characteristics of the liquid 5 are determinative of certain operative characteristics of the device as a whole, and will be described more in detail hereinafter.

Sealed into the container 1 along with the liquid 5 is a diver (Cartesian type) or float 7. The diver 7 may be formed, for example, as a light metal container or chamber 9 having one flexible face 11 and downwardly projecting contacting points 13. The chamber 9 is preferably filled with an inert gas and hermetically sealed.

Formed in the bottom of the chamber 1 are a number of grooves or channels 15 (see also Fig. 3), carrying liquid levels of mercury 17, to which sealed electrical terminals 19 are connected. The channels 15 are located to engage the contacting points 13 on the diver 7. Thus, when the diver 7 is in the bottom of the chamber 1, the contacting points 13 complete the electrical connections across the terminals 19 otherwise not.

The container 1 is supported in a metal frame 21. One of the flexible faces 3 is engaged by one end of a pillar or rod 23, formed of a metal having a different coefficient of thermal expansion than the frame 21, and supported at its other end by said frame 21. The other flexible face 3 is engaged by a threaded adjusting screw 25, formed of the same metal as the frame 21, supported in the frame 21, and carrying on its outer end an adjusting head 27 and pointer 29. The pointer 29 registers on a scale 31 on the frame 21, indicating the position at the time of the screw 25.

It will be seen that the flexible walls 3 can be flexed to greater or less extent by advancing or retarding the screw 25.

The operation of the device is as follows:

Under normal conditions, such as when no pressure is placed on the flexible walls of the chamber or container 1, the diver 7 is arranged to displace a volume of the liquid 5 equal in weight to the weight of the diver itself. Under such conditions, the diver 7 floats in the liquid 5. If, now, pressure is brought to bear on either of the flexible faces 3, the internal volume of the container 1 decreases. The liquid 5 is relatively incompressible, so that, to compensate for the decreased volume of the container 1, the liquid pressure flexes the flexible face 11 of the diver 7, reducing the volume of the diver 7 until pressure equilibrium is reestablished. However, the decreased volume of the diver 7 occasions a decrease in weight of the liquid displaced thereby, and as the weight of the diver 7 remains constant, the original condition of the diver 7 no longer persists, and the diver 7, by its own weight, sinks to the bottom of the container 1 and completes the electrical circuit between the terminals 19.

The movement of the diver 7 in the container 1 is quite critical, slight pressure changes being sufficient to occasion making and breaking of the electrical connections.

Temperature controlled or thermostatic action of the device is secured in the following manner:

The rod 23 and the frame 21 (including the screw 25) are composed of different materials having different coefficients of temperature expansion. In the first case, assume the rod 23 to have a higher coefficient: that is, the linear expansion per degree temperature rise is greater. It will readily be seen that with increasing temperature the distance A (Fig. 1) between the faces of the rod 23 and the screw 25 diminishes. Thus pressure is brought to bear upon the container 1, and the diver 7 is ultimately forced to contacting position.

As a second case, assume that the rod 23 has a lesser coefficient of expansion; then the increasing temperature will increase the distance A and pressure on the container 1 will be diminished. If, in this embodiment, the container is initially under sufficient pressure to force the diver 7 into contacting position, increasing temperature will ultimately relieve the pressure on the container until the diver 7 breaks contact by moving upwardly.

It will be clear from the above that there is a critical value for the distance A. When this critical value is exceeded, contact is broken, and when the distance A falls short of the critical value, contact is maintained.

The distance A is determined by two factors: (1) the temperature, and (2) the adjustment of the screw 25. It will be seen that adjustment of the screw 25 will vary the temperature at which the critical value of the distance A is reached. For example, if the screw 25 is advanced (decreasing A) a smaller temperature increment will, in the first case above mentioned, be sufficient to expand the rod 23 enough to reach the critical value of A. Whether the relationship is linear or non-linear, the scale 31 may be calibrated directly in degrees of temperature.

Inasmuch as the force causing the diver 7 to rise or to fall is determined by the instantaneous relation of its weight to the weight of the volume of liquid it displaces, it will be seen that an increased criticalness of adjustment may be obtained by increasing the density of the liquid, thus obtaining greater differential weights and forces for given volume changes. The liquid to be utilized in the invention is thus to be determined according to the criticalness of temperature control desired.

Criticalness of control may also be achieved by choosing a liquid of high coefficient of expansion, in which case the expansion of the liquid is added to the expansion of the framework or externally applied pressure and the buoyancy of the diver 7 is thus more quickly effected. This is true in the case where increase in temperatures closes the contacts.

A second embodiment of the invention is that in which the buoyancy of the diver 7 is varied by the pressure differential set up between container and liquids of varying coefficients of temperature expansion. In such an embodiment, the frame 21, rod 23, and screw 25 are not used, the apparatus being otherwise as illustrated in Figs. 1 to 3. Should it be desired to make contact upon increase of temperature, the expansion of the liquid should be more rapid than the expansion of the container. With these conditions, and a relatively non-expansible container, temperature rise increases the internal pressure on the diver 7, thus decreasing its volume, and its buoyancy, and causing it to sink and complete the electrical circuit.

It is desirable in this second embodiment of the invention that the liquid volume be kept as small as conveniently possible, so that the time lag is minimized. Appropriate heat radiating fins on the container likewise contribute to minimizing the time lag, and increasing the efficiency of operation.

A third embodiment of the invention is illustrated in Figs. 4 and 5. While the embodiments already described are useful in cases where the current is not large, with larger currents the sparking or arcing at the contact points may carbonize the liquid (such as oil) and in so doing alter the density of the liquid and the operating characteristics thereof. In the Figs. 4 and 5 embodiment, the contacts are made and broken in a separate compartment, and this difficulty is thereby overcome.

Referring to Fig. 4, numeral 33 indicates a mercury switch comprising an inert gas-filled circular cylinder, having contact points 35 sealed therein, and including a small pool of mercury 37. The advantage of this conformation is that substantially no work is performed in rotating the cylinder 33 to make and break contacts, the mercury remaining static while the cylinder rotates. Further details of this form of switch 33 are set forth in said copending application.

The contact points 35 are individually secured to rigid conducting arms 39, and the arms 39 are in turn connected to flexible conducting springs or hinges 41. The springs 41 are in turn connected to leads 43, which are sealed hermetically in the container 1 and provide exterior terminals for the thermostat.

On each side of the cylindrical switch 33, and preferably concentric therewith, is secured a compression chamber 45, which is similar to the diver 7 in the first embodiment. The chambers 45 are provided with flexible faces 47 and are hermetically sealed preferably with a filling of inert gas.

The container 1 is similar to the container 1 of the Fig. 1 embodiment, and is similarly completely filled with liquid 5. The present embodiment may be operated according to the principles of the first embodiment, that is, with an exterior frame 21, rod 23, and screw 25, and flexible faces on the container 1, or, it may be operated on the principles of the second embodiment, namely, with an inflexible container and differing container and liquid coefficients of expansion.

Figs. 4 and 5 illustrate the frame 21, rod 23, and screw 25 only in a diagrammatic manner, and it is to be understood that suitable knobs, pointers, scales and the like may be provided.

The operation of the Fig. 4 embodiment is similar to the operations hereinbefore described. On change of temperature, the cylinder 33 rises or sinks, and the contacts 35 immerse in or emerge from the mercury 37 to make or break contact, as the case may be. The temperature differential causing operation may be quite small. This is explained as follows:

Consider first that the mercury drop 37 is omitted. For balanced condition in the thermostat there is one temperature, and hence one volume of the compression chambers 45, at which equilibrium is maintained. At this condition, the net moment about the hinges 41 to zero: that is, the volume of the submerged elements, multiplied by the liquid density, and multiplied by the horizontal distance between the hinge and the center of buoyancy, is equal to the weight of the moving elements multiplied by the horizontal distance between the hinges and its center of gravity. Except for two secondary effects, the moving element is now in equilibrium in any position, so that the slightest change of temperature suffices to cause a complete excursion either up or down, as the case may be.

The first secondary effect is as follows: When a chamber such as 33 is immersed in a liquid with a free surface, then, as it is forced deeper into the liquid, the flexible faces 47 will be progressively compressed, due to the increasing hydrostatic head, and the volume thereof will progressively decrease. In general, then, the chamber will float if released above a certain depth, and sink if released below such depth. In the case of the present invention, however, there is no free surface for the liquid, and a change in volume of the chamber 33 must be accompanied by a change in volume of the relatively rigid container 1 or an actual change in density of the liquid. The container 1 is, relative to this effect, quite rigid, and it is evident that under normal conditions no change will take place in the density of the liquid. Hence, in the present invention, the effect above noted is largely suppressed. There is, however, a slight tendency manifested for the moving elements to be in unstable equilibrium, such that a movement (up or down) once started will be fully completed.

The second secondary effect is that the slight stiffness of springs or hinges 41 opposes motion of the moving elements, and tends to hold such elements in mid-position.

The two secondary effects, it will be seen, largely neutralize each other, or at worst may be made so small as to be negligible.

Thus far the device has been considered with the drop of mercury 37 absent. Assume, now, the addition of the mercury 37, and a simultaneous increase of volume of the chambers 45 to compensate in buoyancy for the weight of the added mercury (thereby securing actual operating characteristics of this embodiment of the invention). Two new forces have been added to the system previously discussed: (1) the downwardly-acting weight of the mercury, and, (2) the upwardly-acting increased buoyancy. These forces are equal and opposite, and for all positions of the moving element. Further, they each pass through the central axis of the cylinder 33. Hence they add no net moment to the system, and the previous explanation of the mercury-less system holds.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A thermostat comprising a closed container, said container being completely filled with liquid, an element of variable volume adapted to move in said liquid, and means associated with said element for making and breaking electrical contacts.

2. A thermostat comprising a closed container, said container being completely filled with liquid, an element of variable volume adapted to move in said liquid, means for externally applying pressure to said container in response to exterior temperature variations, and means effecting a control in response to the movements of said element.

3. A thermostat comprising a closed container, said container being completely filled with liquid, an element of variable volume adapted to move in said liquid, means for externally applying pressure to said container in response to exterior temperature variations, said means comprising a frame including at least two materials having different coefficients of thermal expansion, and means effecting a control in response to the movements of said element.

4. A thermostat comprising a sealed container having at least one flexible wall, said container being completely filled with a liquid, means engaging the flexible wall of said container responsive to temperature changes whereby varying pressures are placed upon the liquid in said container by said temperature changes, and a diver in said liquid, said diver being adapted to change volume to compensate for the varying pressure in said liquid.

5. A thermostat comprising a sealed container having at least one flexible wall, said container being completely filled with a liquid, means engaging the flexible wall of said container responsive to temperature changes whereby varying pressures are placed upon the liquid in said container by said temperature changes, and a diver in said liquid, said diver being adapted to change volume to compensate for the varying pressure in said liquid, and means associated with said diver for making and breaking electrical contacts.

6. A thermostat comprising a sealed container having at least one flexible wall, a frame of one metal engaging said container on at least one surface thereof, and an element of a second metal engaging said container on another surface thereof, and means for adjusting the engagement of at least one of said metals with said container, said metal being of different coefficients of thermal expansion, said container being completely filled with liquid, and a diver in said container, said diver comprising a sealed, gas-filled chamber having at least one flexible surface, and means associated with said diver for making and breaking electrical contacts in response to movement of said diver.

7. A thermostat comprising a sealed container having at least one flexible wall, a frame of one metal engaging said container on at least one surface thereof, and an element of a second metal engaging said container on another surface thereof, and means for adjusting the engagement of at least one of said metals with said container, said metal being of different coefficients of thermal expansion, said container being completely filled with liquid, grooves at the bottom of said container and mercury in said grooves, and means for establishing electrical connections from the exterior of said container to said mercury, and a diver freely moving in said liquid, said diver comprising a sealed gas-filled chamber having at least one flexible face and including contacts adapted to engage with said mercury to complete electrical contact when said diver is in the lower portion of said container.

8. A thermostat comprising a sealed container, said container being completely filled with liquid, a diver freely moving in said liquid, said diver comprising a sealed gas-filled chamber having at least one flexible wall, said diver being adapted to rise and fall within said liquid in response to pressure externally applied to said container, and means for applying pressure externally to said container responsive to temperature variations, means for independently adjusting said frame to apply a greater or lesser pressure.

9. A thermostat comprising a sealed container and a liquid completely filling said container, said container and said liquid being of different coefficients of thermal expansion, and a diver in said container adapted to move up and down in response to varying exterior temperatures.

10. A thermostat comprising a sealed container and a liquid completely filling said container, said container and said liquid being of different coefficients of thermal expansion, and a diver in said container adapted to move up and down in response to varying exterior temperatures, and means associated with said diver for making and breaking electrical contacts as said diver moves up and down.

11. A thermostat comprising a sealed container, a liquid completely filling said container, a mercury switch adapted to move within said liquid, at least one chamber of variable volume secured to said switch, the switch and chamber together being such that the weight of the liquid displaced thereby is equal to the weight of said switch and chamber under normal temperature conditions, and means for imposing a pressure on said liquid in response to temperature variations exterior to said container, said change of pressure being then compensated for by said chamber, thereby causing said chamber and said switch together to displace a weight of liquid unequal to the weight of said switch and chamber together, whereby said switch is caused to move and make or break electrical contacts therein.

12. A thermostat comprising a sealed container, a liquid completely filling said container, a mercury switch adapted to move within said liquid, at least one chamber of variable volume secured to said switch, the switch and chamber together being such that the weight of the liquid displaced thereby is equal to the weight of said switch and chamber under normal temperature conditions, and means for imposing a pressure on said liquid in response to temperature variations exterior to said container, said change of pressure being then compensated for by said chamber, thereby causing said chamber and said switch together to displace a weight of liquid unequal to the weight of said switch and chamber together, whereby said switch is caused to move and make or break electrical contacts therein, and means for making electrical connections from the exterior of said container to said mercury switch.

13. A thermostat comprising a sealed container, a liquid completely filling said container, a mercury switch adapted to move within said liquid, at least one chamber of variable volume secured to said switch, the switch and chamber together being such that the weight of the liquid displaced thereby is equal to the weight of said switch and chamber under normal temperature conditions, and means for imposing a pressure on said liquid in response to temperature variations exterior to said container, said change of pressure being then compensated for by said chamber, thereby causing said chamber and said switch together to displace a weight of liquid unequal to the weight of said switch and chamber together, whereby said switch is caused to move and make or break electrical contacts therein, said pressure imposing means comprising a frame including at least two metals of different coefficients of thermal expansion.

14. A thermostat comprising a sealed container, a liquid completely filling said container, a mercury switch adapted to move within said liquid, at least one chamber of variable volume secured to said switch, the switch and chamber together being such that the weight of the liquid displaced thereby is equal to the weight of said switch and chamber under normal temperature conditions, and means for imposing a pressure on said liquid in response to temperature variations exterior to said container, said change of pressure being then compensated for by said chamber, thereby causing said chamber and said switch together to displace a weight of liquid unequal to the weight of said switch and chamber together, whereby said switch is caused to move and make or break electrical contacts therein, said pressure imposing means comprising the container itself, said container and said liquid having different coefficients of thermal expansion.

15. A thermostat comprising a Cartesian diver and means for varying the pressure on said diver in response to varying temperature, whereby said diver is caused to rise and fall in response to temperature variations, and electrical contacts associated with said diver whereby electrical connections are made when said diver falls and broken when said diver rises.

JOHN A. SPENCER.